Aug. 26, 1969     M. ARDITTI     3,464,060
AUTOMOBILE THEFT ALARM SYSTEM
Filed Aug. 13, 1965

INVENTOR
MORDECHAI ARDITTI
BY
Don Finkelstein
ATTORNEY

United States Patent Office 3,464,060
Patented Aug. 26, 1969

3,464,060
AUTOMOBILE THEFT ALARM SYSTEM
Mordechai Arditti, Los Angeles, Calif.
(7719 Yarmouth Ave., Reseda, Calif. 91335)
Filed Aug. 13, 1965, Ser. No. 479,398
Int. Cl. B60r 25/10, 25/04
U.S. Cl. 340—64
7 Claims

ABSTRACT OF THE DISCLOSURE

There is disclosed herein an improved automobile alarm and theft warning arrangement in which the horn of the automobile is automatically sounded upon either activation of the ignition switch or "hot wiring" around the ignition switch. Further, there is a direct short between the insulated contact of the breaker points on the distributor, which prevents the generation of any low current pulses to the spark coil. Thus, no high voltage spark is generated, and it is impossible to start the engine regardless of how electricity is supplied to the ignition system.

---

Figure 1:
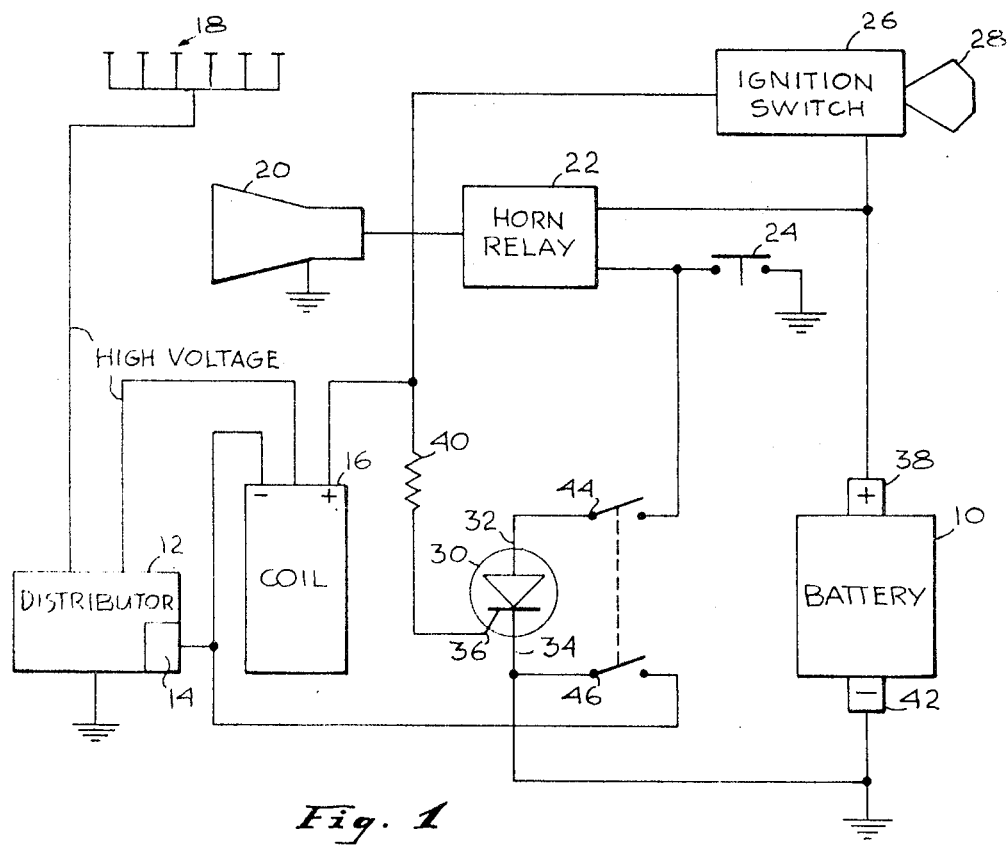

This invention relates to a protection system for automobiles and more particularly to a combined system for providing an audible signal and simultaneously preventing operation of an automobile when unauthorized use is attempted.

Crime statistics have indicated a large increase in recent years in automobile theft and "joy riding." Joy riding, of course, is generally accomplished by juveniles who take a car without an owner's permission and ride it for a short time. However, both outright theft as well as joy riding have presented an increasing problem to not only criminal detection and apprehension authorities but also to insurance companies and automobile owners. Consequently, there has long been a need for an improved arrangement that would prevent the unauthorized operation of a motor vehicle, and also, provide some sort of an alarm so that the person attempting such unauthorized use may be either frightened away or more readily apprehended, without being able to operate the automobile.

Further, the alarm and prevention system should preferably be concealable in the automobile in places known only to the authorized users of the automobile and, generally, should not be directly connected to or positioned adjacent to parts of the automobile operational system that are normally used by the driver, in order that the system may not be readily disabled by the unauthorized user.

Alarm systems utilized in the past have not, in general, been able to meet these desiderata. In many of such systems, the ignition switch itself became part of the alarm system, and connections to the alarm system were made directly thereto. Such systems, in general, were not only able to be seen readily by an unauthorized user, since an extra connection was presented on the ignition switch, but often did not prevent theft of the car by by-passing the ignition switch through "hot wiring" or similar devices that did not require utilization of the ignition switch and yet allowed full utilization of the automobile without sounding the alarm.

Other prior art systems often provided only an alarm, but in no way prevented operation of the automobile by unauthorized users thereof.

Accordingly, it is an object of applicant's invention herein to provide an improved alarm system.

It is another object of applicant's invention herein to provide an alarm system that may be readily concealed in an automobile.

It is yet another object of applicant's invention herein to provide an automobile alarm system that prevents unauthorized operation of an automobile.

The above and other objects are achieved, according to one embodiment of applicant's invention, by providing as the primary control unit in an automatic alarm system for an automobile, a silicon controlled rectifier. The cathode connection of the silicon controlled rectifier is connected to the negative terminal of the automobile battery, or to any other convenient negative tie point. In most American cars, the negative terminal of the battery is connected to the chassis. Thus, the cathode terminal of the silicon controlled rectifier may be connected to the chassis, sometimes referred to as ground.

It will be appreciated, of course, that applicant utilizes herein a negatively grounded system as an example. Those skilled in the art may easily see the connections necessary for positively grounded electrical systems in automobiles.

The gate terminal of the silicon controlled rectifier is connected, through a resistor, to the positive terminal of the battery through the ignition switch, which must be positive for operation of the engine and the anode terminal of the silicon controlled rectifier is connected, through a manually-operated normally open switch to a horn relay. The horn, which may be considered a source of audible alarm energy, and horn relay may be part of the automobile system, or, if desired, they may be supplied separately with the alarm system of applicant's invention in order that the horn may be readily concealed to provide a hidden source of audible alarm.

A connection is also made from the cathode terminal of the silicon controlled rectifier through a second manually operated, normally open switch mechanically linked together with the first switch for operation simultaneously therewith to the insulated contact of the breaker points on the distributor. In a normal position, that is, when the automobile is being utilized by an authorized owner, the first and the second switches are open and the entire alarm system presents no effect upon normal operation of the automobile. However, when the automobile, for example, is parked and the ignition system is off, the first and second switches may be manually closed to activate the alarm system. The first and second switches, being operable together, may be conveniently provided in a comparatively small case which may be concealed any place in the automobile that the authorized user thereof desires. For example, such places may be the glove compartment, under the front seat, behind the dashboard, or the like.

Since a positive voltage is provided through the horn relay to the anode terminal of the silicon controlled rectifier, the silicon controlled rectifier is in a "cocked" condition. That is, it is ready to be triggered and conduct current between the cathode and the anode under the proper conditions. These proper conditions, in applicant's improved invention, occur when any attempt is made to provide a voltage to the ignition system of the automobile from any source whatsoever. Thus, whether it is by hot wiring, utilization of the ignition key in the ignition switch, jumping the ignition switch, or any other method whatsoever, as soon as there is a positive voltage in the ignition system, which would provide a positive voltage from the battery to the positive (hot) side of the ignition coil, there is a DC voltage, applied to the gate terminal of the silicon controlled rectifier, and this voltage turns the silicon controlled rectifier on. When the silicon controlled rectifier is turned on and positive current flows between the anode and the cathode, the horn relay is energized through the closed first switch to sound the horn and provide the audible alarm. Also, there is a direct short between the insulated contact of the breaker points on the distributor and chassis which prevents any low current pulses, normally caused by the breaker points, to be formed in the primary of the ignition coil. Therefore, there is no high voltage spark generated in the secondary of the ignition coil for transmittal to the spark plugs and no type of starting of the automobile may take place.

Figure 2:
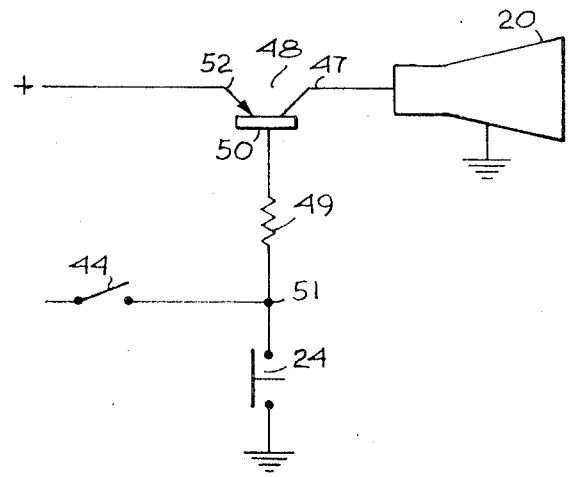

The above and other objects of applicant's invention may be more readily understood from the following detailed description taken together with the accompanying drawings wherein similar reference characters refer to similar elements throughout and in which:

FIG. 1 is a schematic diagram illustrating one embodiment of applicant's invention; and FIG. 2 is a schematic diagram illustrating another embodiment of applicant's invention.

Referring now to FIG. 1, there is shown one embodiment of applicant's invention as utilized in a typical spark-ignition engine automobile. The automobile is generally provided with a source of electrical energy, such as the battery 10, a distributor 12 having breaker points 14, an ignition coil 16, a plurality of spark plugs 18, a horn 20, a horn relay 22 and a horn button 24, and an ignition switch 26 operated by an ignition key 28. In normal operation, the ignition key 28 is turned to the "start" position, though it will be appreciated, of course, that other means, such as floor buttons may be provided, and turning the ignition key provides a positive voltage in the negatively grounded system shown on FIG. 1, to the breaker points of the distributor through the ignition coil. Since the breaker points of the distributor are being actuated by the rotation of the engine by the starter motor (not shown), current pulses are formed by the breaker points 14 and transmitted to the primary of the coil 16. The coil 16 in turn generates the high voltage pulses that are transmitted to the spark plugs 18 and the engine is started.

As soon as the engine is started, of course, the starter motor disengages and the engine runs on electrical energy supplied by the generator (not shown). From this brief description of the electrical system involved in an ignition system for a spark ignition internal combustion engine as commonly used in automobiles, it can be seen it is necessary that in order for the engine to operate, the ignition coil 16 be provided with the current pulses from the source of electrical energy such as the battery 10. If the current pulses are not provided, then it is impossible to start the automobile containing the above described ignition system.

Applicant's improved alarm system provides not only for an audible signal through, for example, the horn 20, but also prevents the flow of current through the breaker points 14 in order not to form current pulses so that the engine may not be started.

Applicant provides a silicon controlled rectifier 30 having an anode terminal 32, a cathode terminal 34 and a gate terminal 36. The gate terminal 36 is connected to a second side or positive terminal 38 of the battery 10 through resistor 40 and ignition switch 26. The resistor 40 limits the current flowing into the gate so as not to exceed the maximum power dissipation of the silicon controlled rectifier 30.

The cathode terminal 34 of the silicon controlled rectifier 30 is connected to the first side, or negative terminal 42 of the battery 10. The anode terminal 32 of the silicon controlled rectifier 30 is connected, through a first manually operated normally open switch 44 to the horn button 24 connection, which provides the negative polarity connection on the horn relay 22. If desired, a second manually operated normally open switch 46 may be mechanically linked to operate with the first switch 44 to provide a connection between the cathode terminal 34, and, therefore, chassis of the silicon controlled rectifier and the low voltage supply to the breaker points 14 of the distributor 12. Without this connection through the second switch 46, applicant provides only an alarm through the horn 20 when unauthorized use is made of the automobile, but with the connection through the switch 46 from the cathode terminal 34 of the silicon controlled rectifier 30 to the low voltage supply to the breaker points 14 of distributor 12, the entire ignition system is simultaneously rendered inoperative to prevent the generation of any spark at the spark plugs 18.

Applicant's invention is utilized when the automobile is parked. First switch 44 and, if present, second switch 46, are closed. The structure containing first switch 44 and second switch 46, may, at the authorized user's discretion, be placed anywhere in the automobile that may be desired. Preferably, this is some concealed location that will not be readily found except by a most thorough and time-consuming examination. It makes no difference in the operation of applicant's invention whether or not the ignition key 28 is removed from the ignition switch 26. The ignition switch 26 must, of course, be put in the off position before the first switch 44 and second switch 46 are closed, otherwise, immediate actuation of the horn 20 and disablement of the entire ignition system would occur.

However, when the ignition switch 26 is off, whether or not the key 28 is removed, and first switch 44 and second switch 46 are closed, the silicon controlled rectifier 30 is "cocked" by the application of the positive voltage at the anode terminal 32 thereof. As is well known, a silicon controlled rectifier is essentially a latching device and once the silicon controlled rectifier 30 is turned on, the comparatively large resistance between the cathode and anode which, in the off condition may be on the order of several megohms, drops to, for example, less than 50 ohms to allow the easy flow of positive current between anode and cathode. Therefore, with the positive voltage supplied at the anode terminal 32 the voltage applied to the gate terminal 36 of the silicon controlled rectifier 30 controls the silicon controlled rectifier to allow the silicon controlled rectifier 30 to be turned on. If there is any attempt to start the automobile, whether it be by means of the key 28, bypassing the ignition switch entirely through hot-wiring, bypassing the ignition switch 26, or any other method, voltage must be present at the ignition coil 16 in order that current pulses be produced in the primary of the ignition coil 16 to supply voltage to the spark plugs 18. However, as soon as there is a voltage on the primary of the ignition coil 16, there is provided an information signal current through the resistor 40 to the gate terminal 36 of the silicon controlled rectifier 30 to result in a current from the DC voltage of the battery 10. This voltage value, usually on the order of 6 volts or 12 volts, is sufficient to turn on the silicon controlled rectifier 30.

Therefore, the silicon controlled rectifier is turned on by the first impulse of current through the resistor 40 and allows electrical current flow between the anode terminal 32 and anode terminal 34. With this current flow, however, and remembering that the first switch 44 and second switch 46 are closed, horn relay 22 is energized, sounding the horn, the breaker points 14, in the distributor 12 are shorted out directly to chassis and therefore do not form the current pulses that must be provided to primary of the ignition coil 16 in order that a high voltage spark may be produced at the spark plugs 18.

Since the silicon controlled rectifier 30 is on, the internal positive feedback maintains the silicon controlled rectifier on, once there has been sufficient current applied to the gate terminal 36 to turn the silicon controlled rectifier 30 on.

Similarly, the closed first switch 44 provides a direct path to ground through the silicon controlled rectifier 30 from the horn relay 22 energizing the horn relay. Operation of the horn relay then, of course, energizes the horn 20 to provide an audible signal.

As shown on FIG. 1, the horn 20 is part of the normal automobile equipment and is wired into the normal horn button 24 which is found, generally, on the steering wheel of the automobile. It will be appreciated, however, that a separate horn and horn relay other than the horn and horn relay that is found on the automobile, such as the horn 20 and horn relay 22, may be utilized in applicant's invention. This horn and horn relay may be positioned anywhere that is convenient in order that it may not be readily disabled by an unauthorized user of the automobile. If the connection between the breaker points 14 of the distributor 12 and the cathode terminal 34 of the silicon controlled rectifier 30 through the second switch 46 is not provided, then operation of applicant's improved alarm system is the same as that described above except that the ignition system of the automobile is not rendered inoperative but only the audible alarm is provided.

Applicant has found several silicon controlled rectifiers that are satisfactory for utilization in applicant's improved alarm system. For example, a Motorola No. MCR 1304, Texas Instrument or General Electric No. 2N681, or RCA No. 2N3228. Such silicon controlled rectifiers generally have a peak reverse blocking voltage of more than 15 volts, a peak forward blocking voltage of more than 15 volts, a forward DC current of about 3 amps max., a gate trigger current of about 50 milliamps max., and a holding current of about 200 milliamps max. When such or similar silicon controlled rectifiers are utilized, the resistance of resistor 40 may be on the order of 220 ohms with a 12 volt battery.

It will be appreciated that certain automobiles are not provided with a horn relay 22. In that event, the appropriate connection from the anode terminal 32 through the first switch 44 is made directly to the horn, if the silicon controlled rectifier is one that can carry the necessary current.

The silicon controlled rectifier 30, acting as a latching device, keeps the horn 20 sounding its audible alarm, and, simultaneously, the breaker points 14 are shorted until the first switch 44 and second switch 46 are intentionally opened, or until the battery 10 is completely run down below the value necessary to supply the holding current between anode terminal 32 and cathode terminal 34.

Instead of a typical horn relay 22 as illustrated schematically in FIG. 1, a transistor may be utilized intermediate the horn button 24 and the horn 20 to provide the similar function of a horn relay 22. Applicant's invention may nevertheless be utilized where there is provided a transistor in place of the horn relay 22. The appropriate connections for such an arrangement are illustrated in FIG. 2. As shown in FIG. 2, there is the horn 20 connected to a collector terminal 47 of a transistor 48. A base terminal 50 of the transistor 48 is connected to the horn button 24 through resistor 49, which limits emitter to base current flow and the emitter terminal 52 of the transistor 48 is connected to the positive voltage of the battery 10, in negatively grounded automobiles. The switch 44 is connected to the horn button terminal 51 and operation of the horn 20 when provided with the transistor 48 instead of the horn relay 22, would be the same as described above.

From the above description, it can be seen that applicant has provided an improved alarm system for an automobile that not only provides an audible signal when unauthorized use of the automobile occurs, but also prevents the generation of any spark in the spark plugs. No re-wiring or modifications to the ignition switch itself need be made, and applicant's invention provides sure protection against any form of unauthorized starting of the automobile.

What is claimed is new and desired to be secured by Letters Patent of the United States is:

1. A protection system for an automobile to prevent the unauthorized utilization of the automobile and the automobile being of the type having a source of electrical energy, a source of audible energy, a spark ignition engine, and spark means for generating a spark in said spark ignition engine and said source of electrical energy for supplying electrical energy to said spark means for the condition of said spark ignition engine operating comprising, in combination:

a control unit having a first terminal, a second terminal and a third terminal, and said second terminal connected to a first side of the source of electrical energy and said control unit allowing passage of electrical energy between said first terminal and said second terminal upon the receipt of an information signal at said third terminal;

a first switch means;

means for connecting said first switch means to said first terminal of said control unit and to said source of audible energy in said automobile, and said first switch means of the normally open type and adapted to be closed for the condition of the automobile being inoperative;

and said third terminal of said control unit connected to a second terminal of said source of electrical energy in said automobile for providing said information signal at said third terminal of said control unit upon the condition of electrical energy being supplied to said spark means for generating the spark in the spark ignition engine to energize said source of audible energy to provide an audible alarm.

2. The arrangement defined in claim 1 and further including a second normally open switch means mechanically linked to said first normally open switch means and adapted to be opened and closed therewith for providing a direct short between said means for generating a spark in said spark ignition engine and said first terminal of said source of electrical energy.

3. The arrangement defined in claim 2 wherein said control unit is a silicon controlled rectifier and said first terminal is the anode terminal of said silicon controlled rectifier, said second terminal is the cathode terminal of said silicon controlled rectifer, and said third terminal is the gate terminal of said silicon controlled rectifier, and further including a resistor between said gate terminal and said second side of said source of electrical energy.

4. The arrangement defined in claim 3 wherein said source of electrical energy is a battery and said first side thereof is the negative side and said second side thereof is the positive side.

5. A safety system for an automobile for preventing the unauthorized utilization thereof and the automobile of the type having a horn for providing an audible signal and a horn relay means for controlling operation of said horn, and also having a spark ignition engine, said an ignition system for said spark ignition engine comprising a source of electrical energy for supplying a flow of electrical energy in said ignition system, an ignition coil adapted to generate high voltage pulses to be supplied to the spark ignition engine to generate the spark therein, and a distributor having breaker points for providing current pulses to said coil, comprising, in combination:

a silicon controlled rectifier having a cathode terminal, an anode terminal and a gate terminal, and said silicon controlled rectifier adapted to allow the flow of electrical energy between said anode terminal and said cathode terminal upon receipt of an information signal at said gate terminal;

a first normally open switch means adapted to be closed when it is desired to prevent unauthorized utilization of the automobile connected between said horn relay and said anode terminal of said silicon controlled rectifier for energizing said horn upon receipt of said information signal at said gate terminal of said silicon controlled rectifier;

said cathode terminal of said silicon controlled rectifier connected to a first side of said source of electrical energy;

a second normally open switch means mechanically linked to said first normally open switch means and adapted to be open and closed therewith and connected between said breaker points of said distributor and said first side of said source of electrical energy to provide a direct short therebetween for said second normally open switch in the closed condition;

and said gate terminal of said silicon controlled rectifier connected to a second side of said source of electrical energy to provide said information signal at said gate terminal upon the condition of the flow of electrical current in the igntion system.

6. The arrangement defined in claim 5 wherein said first side of said source of electrical energy is ground with respect to said second side of said source of electrical energy.

7. The arrangement defined in claim 5 wherein said second side of said source of electrical energy is ground with respect to said first side of said source of electrical energy.

References Cited

UNITED STATES PATENTS

| 2,515,044 | 7/1950 | Kappel | 340—63 |
| 2,935,730 | 5/1960 | Procter | 340—63 |
| 3,271,736 | 8/1963 | Brown et al. | 340—52 |

OTHER REFERENCES

Murray, Robert, Jr., Silicon Controlled Rectifier Designers' Handbook, Youngwood, Pa., 1963. pp. ix and 1–i, Tk–2798–M8.

Popular Science, p. 196, received U.S. Pat. Off. Feb. 1, 1955.

JOHN W. CALDWELL, Primary Examiner

KENNETH N. LEIMER, Assistant Examiner